US009857787B2

United States Patent
Saitou

(10) Patent No.: US 9,857,787 B2
(45) Date of Patent: Jan. 2, 2018

(54) NUMERICAL CONTROLLER CONFIGURED TO PERFORM TEACHING OPERATION WITH MECHANISM SECTIONS SWITCHED

(71) Applicant: FANUC Corporation, Minamitsuru-gun, Yamanashi (JP)

(72) Inventor: Manabu Saitou, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 185 days.

(21) Appl. No.: 14/989,846

(22) Filed: Jan. 7, 2016

(65) Prior Publication Data

US 2016/0202687 A1      Jul. 14, 2016

(30) Foreign Application Priority Data

Jan. 14, 2015   (JP) .................................. 2015-005092

(51) Int. Cl.
*G05B 19/402*   (2006.01)

(52) U.S. Cl.
CPC .. *G05B 19/402* (2013.01); *G05B 2219/34015* (2013.01)

(58) Field of Classification Search
CPC ................... G05B 19/402; G05B 2219/34015
USPC ......................................................... 700/61
See application file for complete search history.

(56) References Cited

U.S. PATENT DOCUMENTS

| | | | |
|---|---|---|---|
| 5,250,886 A | 10/1993 | Yasuhara et al. | |
| 6,408,224 B1 * | 6/2002 | Okamoto | B25J 9/1661 29/721 |
| 6,512,961 B1 | 1/2003 | Fukaya et al. | |
| 6,922,610 B2 * | 7/2005 | Okamoto | B25J 9/06 219/121.74 |
| 7,129,664 B2 * | 10/2006 | Kubo | B25J 9/1664 318/567 |
| 7,391,178 B2 * | 6/2008 | Tanaka | B25J 9/1676 318/568.2 |
| 8,764,448 B2 | 7/2014 | Yang et al. | |
| 2004/0158335 A1 * | 8/2004 | Fujibayashi | G05B 19/19 700/61 |
| 2016/0179083 A1 * | 6/2016 | Yamaguchi | G05B 19/4083 700/47 |

FOREIGN PATENT DOCUMENTS

| | | |
|---|---|---|
| JP | H02-173808 A | 7/1990 |
| JP | H03-230202 A | 10/1991 |
| JP | H10-301608 A | 11/1998 |
| WO | WO 00/10769 A1 | 3/2000 |

OTHER PUBLICATIONS

Decision to Grant a Patent dated Oct. 25, 2016 in Japanese Patent Application No. 2015-005092 (3 pages) with an English Translation (3 pages).

* cited by examiner

*Primary Examiner* — Chun Cao
(74) *Attorney, Agent, or Firm* — Drinker Biddle & Reath LLP

(57) ABSTRACT

A numerical controller extracts control object axis from an axis control program to be taught. On the other hand, history information on an axis movement caused by an operator's manual operation is recorded, and an axis (teaching object axis) to be taught by the operator is estimated from the recorded history information. If the estimated teaching object axis is not included in the control object axis, reflection of the position of the axis on the program by a teaching operation is prohibited.

7 Claims, 8 Drawing Sheets

|  | PROGRAM SELECTION MEANS | MANUAL OPERATION MEANS | TEACHING OPERATION MEANS |
|---|---|---|---|
| OPERATION 1 | SELECT PROGRAM MOVE-A |  |  |
| OPERATION 2 |  | MOVE Xb |  |
| OPERATION 3 |  |  | TEACH CURRENT POSITION |

FIG.6

|  | PROGRAM SELECTION MEANS | MANUAL OPERATION MEANS | TEACHING OPERATION MEANS |
|---|---|---|---|
| OPERATION 1 | SELECT PROGRAM MOVE-A | | |
| OPERATION 2 | | MOVE Xb | |
| OPERATION 3 | | | |
| OPERATION 4 | | | TEACH CURRENT POSITION |
| OPERATION 5 | | | TEACH CURRENT POSITION |

FIG.7

|  | PROGRAM SELECTION MEANS | MANUAL OPERATION MEANS | TEACHING OPERATION MEANS |
|---|---|---|---|
| OPERATION 1 | | MOVE Xb | |
| OPERATION 2 | SELECT PROGRAM MOVE-B | | |
| OPERATION 3 | | MOVE Xa | |
| OPERATION 4 | | | TEACH CURRENT POSITION |

FIG.8

|  | PROGRAM SELECTION MEANS | MANUAL OPERATION MEANS | TEACHING OPERATION MEANS |
|---|---|---|---|
| OPERATION 1 | SELECT PROGRAM MOVE-B | | |
| OPERATION 2 | | MOVE Xb | |
| OPERATION 3 | | | TEACH CURRENT POSITION |

FIG.9

|  | PROGRAM SELECTION MEANS | MANUAL OPERATION MEANS | TEACHING OPERATION MEANS |
|---|---|---|---|
| OPERATION 1 | SELECT PROGRAM MOVE-B | | |
| OPERATION 2 | | MOVE Xb | |
| OPERATION 3 | | | TEACH CURRENT POSITION |
| OPERATION 4 | | MOVE Xa | |
| OPERATION 5 | | | TEACH CURRENT POSITION |

|  | PROGRAM SELECTION MEANS | MANUAL OPERATION MEANS | TEACHING OPERATION MEANS |
|---|---|---|---|
| OPERATION 1 | SELECT PROGRAM MOVE-A |  |  |
| OPERATION 2 |  | MOVE Xa |  |
| OPERATION 3 |  | MOVE Xc |  |
| OPERATION 4 |  |  | TEACH CURRENT POSITION |

NUMERICAL CONTROLLER CONFIGURED TO PERFORM TEACHING OPERATION WITH MECHANISM SECTIONS SWITCHED

RELATED APPLICATION DATA

This application claims priority under 35 U.S.C. §119 and/or §365 to Japanese Application No. 2015-005092 filed Jan. 14, 2015, the entire contents is incorporated herein by reference.

BACKGROUND OF THE INVENTION

Field of the Invention

The present invention relates to a numerical controller, and more particularly, to a numerical controller capable of performing a teaching operation for a plurality of programs for controlling a plurality of mechanism sections.

Description of the Related Art

In creating teaching-playback machine control programs, position information on a machine is recorded in a controller after the machine is moved to a desired position. If programs for mechanism sections are intended to be created by a single control panel based on this program creation procedure, however, a problem occurs that an operator cannot easily identify the mechanism sections for which the programs are created.

Even when the programs are displayed on a screen, moreover, programs for another mechanism section may be changed by mistake unless the operator is careful. For a program in which the positions of axes previously selected at the time of teaching are collectively recorded, an erroneous teaching operation may possibly be carried out with no regard to the identity of a program for mechanism section.

In order to solve these problems, Japanese Patent Application Laid-Open No. 2-173808 discloses a technique in which erroneous input is prevented by simultaneously inputting identification data for identifying a teaching object when sequentially teaching a plurality of mechanism sections as control objects.

In order to control a plurality of mechanism sections by a single controller, the axes of the mechanism sections to be controlled are previously set in each program and positions may sometimes be recorded by a teaching operation. Since the teaching operation can be performed in the same manner without regard to the axes previously set in each program, programs for controlling mechanism sections against an operator's intention may be taught in some cases. According to the technique disclosed in Japanese Patent Application Laid-Open No. 2-173808 described above, erroneous input is prevented by simultaneously inputting the identification data for discriminating a mechanism section for which the position is input. In this technique, however, the input contents are so many that operations are inevitably complicated.

SUMMARY OF THE INVENTION

Accordingly, an object of the present invention is to provide a numerical controller capable of easily preventing erroneous teaching in a teaching operation for a plurality of programs for controlling a plurality of mechanism sections.

A numerical controller according to the present invention includes a plurality of axis control programs for individually controlling axes of a plurality of mechanism sections, and configured to reflect the positions of the axes on the plurality of axis control programs by a teaching operation and control the mechanism sections based on the plurality of axis control programs. The numerical controller further includes: a program selection unit configured to select, from among the plurality of axis control programs, an axis control program as an object to be taught; a control object axis extraction unit configured to extract, from among the axes, a control object axis to be controlled by the axis control program selected by the program selection unit; a manual operation unit configured to move the axis by a manual operation; an operation history recording unit configured to record a history of movement of the axis by the manual operation; a teaching operation unit configured to accept the teaching operation; a teaching object axis estimating unit configured to estimate a teaching object, axis based on the history of movement recorded by the operation history recording unit; and an erroneous teaching preventing unit configured to prohibit the position of the axis from being reflected on the axis control programs by the teaching operation if the teaching object axis estimated by the teaching object axis estimating unit is not included in the control object axis extracted by the teaching object axis estimating unit.

The erroneous teaching preventing unit may be configured to notify that the reflection of the position of the axis on the axis control programs by the teaching operation is prohibited.

The erroneous teaching preventing unit may be configured to permit the position of the axis from being reflected on the axis control programs by the teaching operation, by repeatedly performing the teaching operation, even in the case where the reflection of the axis position on the axis control programs by the teaching operation is not permitted.

The teaching object axis estimating unit may be configured to estimate, as a teaching object axis, only the last axis for which the manual operation is performed, among other axes recorded on the movement history.

The teaching object axis estimating unit may be configured to estimate, as a teaching object axis, the axis for which the manual operation has been performed within a certain period of time just before the teaching operation, among other axes recorded on the movement history.

The teaching object axis estimating unit may be configured to estimate, as a teaching object axis, the axis for which the manual operation has been performed after the immediately preceding teaching operation, among other axes recorded on the movement history.

The teaching object axis estimating unit may be configured to exclude a predetermined axis from the teaching object axis to be estimated.

According to the present invention, teaching-playback programs can be prevented from being erroneously taught after a manual operation in the case where a plurality of mechanism sections are controlled by a single controller.

BRIEF DESCRIPTION OF THE DRAWINGS

The above and other objects and features of the present invention will be obvious from the ensuing description of embodiments with reference to the accompanying drawings, in which:

FIG. 6 is a diagram showing the relationships between operations of an operator and individual function means of a numerical controller according to Embodiment 3 of the present invention;

FIG. 7 is a diagram showing the relationships between the operator's operations and individual function means of a numerical controller according to Embodiment 4 of the present invention;

FIG. 8 is a diagram showing the relationships between the operator's operations and individual function means of a numerical controller according to Embodiment 5 of the present invention;

FIG. 9 is a diagram showing the relationships between the operator's operations and individual function means of a numerical controller according to Embodiment 6 of the present invention.

DETAILED DESCRIPTION OF THE PREFERRED EMBODIMENTS

In the present invention, a teaching object axis is estimated from a history of manual operations, a control axis set in a program and the estimated teaching object axis are compared, and erroneous teaching is prevented by disabling a teaching operation. More specifically, a movement of the axis is previously recorded as a manual operation history when executing an axis movement command to move a mechanism section by manual operation, and the teaching object axis is estimated from the manual operation history when executing the teaching operation to record a position in the program. If the estimated teaching object axis is not included in control axes in programs to be taught from now, the teaching operation is determined to be erroneous and prevented from being performed.

Figure 1:
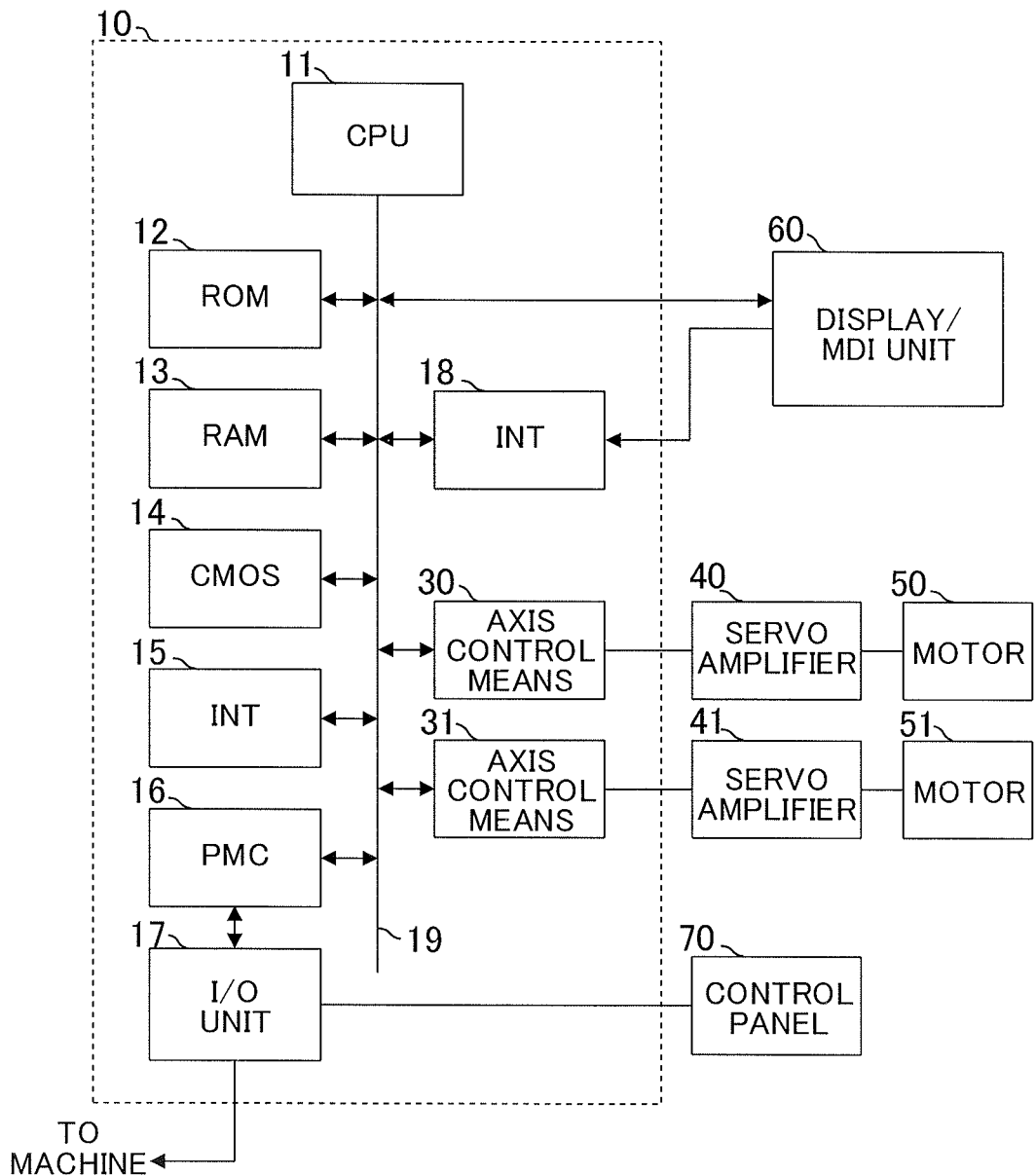
FIG. 1 is a schematic block diagram of a numerical controller according to one embodiment of the present invention.

FIG. 1 is a schematic block diagram of a numerical controller according to one embodiment of the present invention.

A numerical controller 10 according to the present embodiment comprises a CPU 11 for controlling the entire operation of the numerical controller 10, ROM 12 loaded with system programs, RAM 13 being a nonvolatile memory, CMOS 14 being a nonvolatile memory backed up by a battery (not shown), interface 15, PMC (programmable machine controller) 16, interface 18, axis control means 30 and 31, and the like, which are connected to one another by a bus 19.

The CPU 11 reads out the system programs stored in the ROM 12 and generally controls the numerical controller 10 according to the system programs. The RAM 13 is loaded with temporary calculation data, display data and various data input by an operator through a display/MDI unit 60. Further, the CMOS 14 is stored with machine control programs which are read externally (or input through the display/MDI unit 60).

The interface 15 serves to connect the numerical controller 10 and an external device (not shown), such as an adapter. The machine control programs, various parameters, and the like are read from the external device. Further, machining programs edited in the numerical controller 10 can be stored into external storage means through the external device.

The PMC (programmable machine controller) 16 outputs signals to auxiliary devices of a machine tool through an I/O unit 17, thereby controlling them, according to sequential programs stored in the numerical controller 10. On receiving signals from various switches or the like of a control panel 70 on the main body of the machine tool, moreover, the PMC 16 performs necessary signal processing and then delivers the signals to the CPU 11.

The interface 18 receives commands and data from a keyboard of the display/MDI unit 60 which is a manual data input device with a display, the keyboard, and the like, and delivers them to the CPU 11.

The axis control means 30 and 31 for individual axes receive axis movement commands from the CPU 11 and output the commands for the axes to servo amplifiers 40 and 41. On receiving these commands, the servo amplifiers 40 and 41 drive servomotors 50 and 51 for the individual axes, respectively. Although only the two axis control means are shown in FIG. 1, the actually used axis control means are as many as axes of a plurality of mechanism sections of the machine controlled by the numerical controller.

Figure 2:
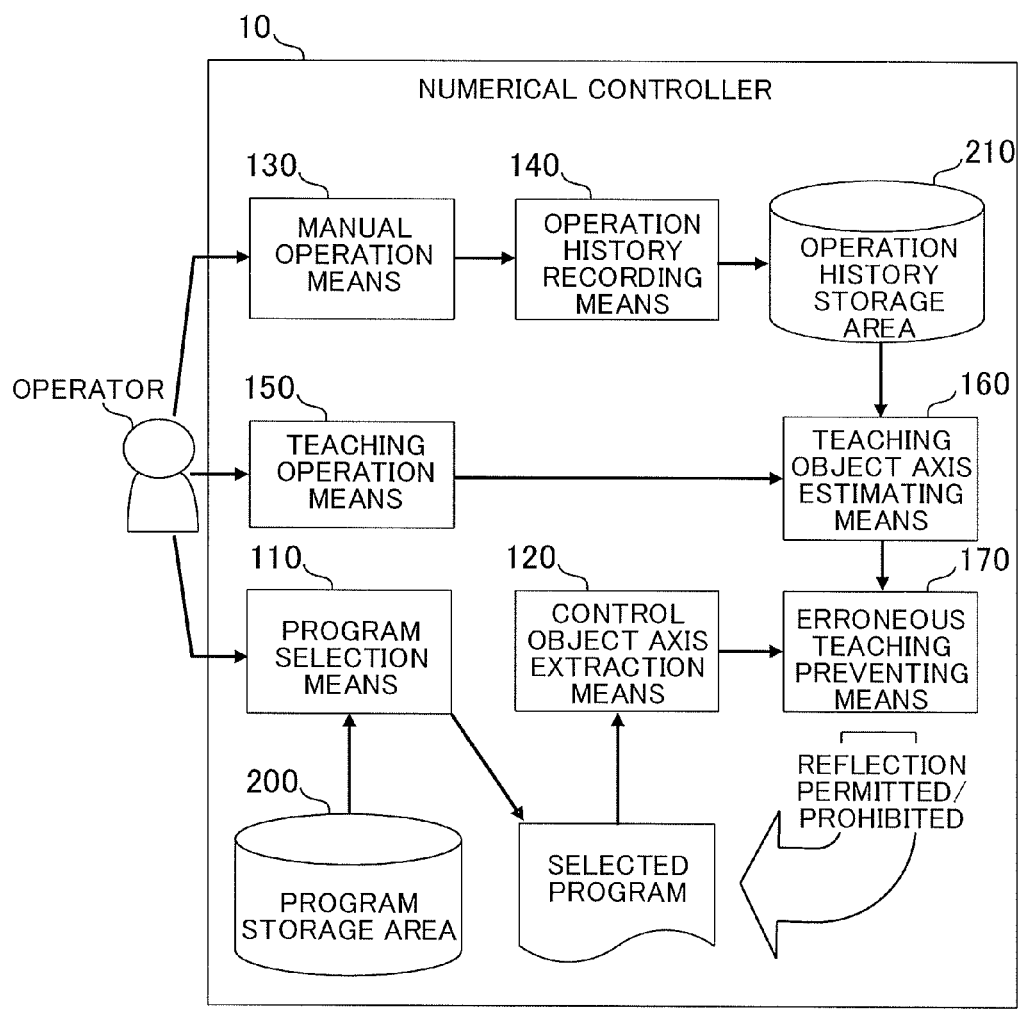
FIG. 2 is a functional block diagram of the numerical controller according to the one embodiment of the present invention.

FIG. 2 is a functional block diagram of the numerical controller 10 according to the one embodiment of the present invention.

In the numerical controller 10 of the present embodiment, the CPU 11 executes the system programs, thereby controlling the entire numerical controller 10 including the display/MDI unit 60 and the control panel 70, and operates as program selection means 110, control object axis extraction means 120, manual operation means 130, operation history recording means 140, teaching operation means 150, teaching object axis estimating means 160, and erroneous teaching preventing means 170.

The program selection means 110 accepts the operator's selection of a program as an object to be taught through the display/MDI unit 60 and selects the program to be taught from a program storage area 200 on a memory such as the CMOS 14. The control object axis extraction means 120 extracts a control object axis from the program as teaching object, which is selected by the program selection means 110.

The manual operation means 130 controls a manual operation to drive the axes of the mechanism sections, based on the operation of the control panel 70 or the like by the operator. The operation history recording means 140 obtains information on the manual operation by the manual operation means 130 from the manual operation means 130. Then, the operation history recording means 140 generates history information on an axis movement caused by the manual operation and records the created history information in an operation history storage area 210 in the RAM 13 or the like. The history information on the axis movement may be recorded in association with the times at which the operator moves respective axes by manual operation. Alternatively, such history information may be recorded together with the temporal context with a teaching instruction given by the teaching operation means 150, which will be described later.

The teaching operation means 150 accepts an instruction for reflection of the operator's teaching operation on the program to be taught through the display/MDI unit 60 and commands each of function means to perform a series of processes related to the reflection of the teaching operation. On receiving the command from the teaching operation means 150, the teaching object axis estimating means 160 estimates a teaching object axis from the content of the operator's manual operation, based on the axis movement history information stored in the operation history storage area 210.

The erroneous teaching preventing means 170 compares the control object axis extracted by the control object axis extraction means 120 and the teaching object axis estimated by the teaching object axis estimating means 160. If the teaching object axis estimated by the teaching object axis estimating means 160 is included in the control object axes extracted by the control object axis extraction means 120, the program to be taught is permitted to be reflected on the axis position. If not, control is made so that the program to be taught is prohibited from being reflected on the axis position.

Embodiment 1

The following is a description of the basic action of the teaching operation performed with a plurality of mechanism sections of the machine switched between one another, which is achieved on the numerical controller 10 with the configuration shown in FIGS. 1 and 2.

Figures 3A, 3B:
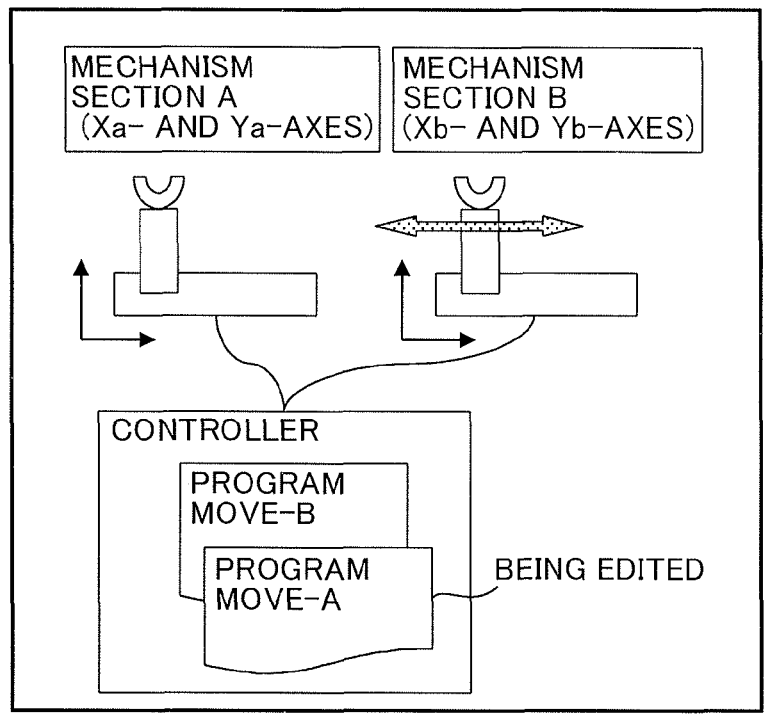
FIGS. 3A and 3B are diagrams illustrating a mechanism controlled by a numerical controller according to Embodiment 1 of the present invention.

FIGS. 3A and 3B are diagrams illustrating a basic action of teaching operation by the numerical controller 10 according to the present embodiment, based on a system in which two mechanism sections, mechanism section A (Xa- and Ya-axes) and mechanism section B (Xb- and Yb-axes) each having two axes, are controlled by the single numerical controller 10, by way of example.

In the present embodiment, as shown in FIG. 3A, programs for moving the mechanism sections A and B, MOVE-A and MOVE-B, are assumed to be created. The two axes (Xa- and Ya-axes) of the mechanism section A and the two axes (Xb- and Yb-axes) of the mechanism section B are previously set as control object axes in MOVE-A and MOVE-B, respectively. In the numerical controller 10, the axes of the mechanism sections can be manually moved by operating the control panel 70. If the axes are moved by manual operation, the axis movement history information is stored in the operation history storage area 210.

Let us assume that an operator performed the following operations in the system having the mechanism sections shown in FIG. 3A.

Operation 1: The operator selected the program MOVE-A by mistake, displayed it on a screen, and started editing, although he/she intended to edit the program MOVE-B.

Operation 2: The operator intended to move the mechanism section B, and he/she moved the Xb-axis by manual operation.

Operation 3: The operator attempt to teach the program MOVE-A to the current position of the mechanism section B.

Further, FIG. 3B is a table showing the relationships between the aforementioned operations by an operator and the individual function means of the numerical controller 10.

As shown in FIG. 3B, the operator selects, in Operation 1, one (MOVE-A in FIG. 3B) of a plurality of programs by the program selection means 110. The program selection means 110 reads out the selected program MOVE-A from the program storage area 200 and displays it on the screen, thereby urging the operator to perform an editing operation or the teaching operation.

When the operator then operates, in Operation 2, the control panel 70 to move the Xb-axis, the manual operation means 130 controls and drives the Xb-axis of the mechanism section B based on the operator's operation content, and outputs information on the movement of the Xb-axis based on the operation to the operation history recording means 140. Thereupon, the operation history recording means 140 creates history information on the Xb-axis movement from the received information and loads it into the operation history storage area 210.

Then, if the operator operates, in Operation 3, the display/MDI unit 60 to give the instruction for the reflection of the teaching operation on the program to be taught, the teaching operation means 150 accepts this instruction and commands the teaching object axis estimating means 160 and the like to start processing.

On receiving the command from the teaching operation means 150, the teaching object axis estimating means 160 refers to the history information on the axis movement by the manual operation stored in the operation history storage area 210. Since this history information involves only the Xb-axis, the Xb-axis is the estimated teaching object axis. Since the Xb-axis is not included in the control object axes (Xa, Ya) of the mechanism section A selected as the program to be taught, the erroneous teaching preventing means 170 prohibits reflection of the teaching operation. Thus, the program MOVE-A can be prevented from being changed unintentionally.

Figure 4:
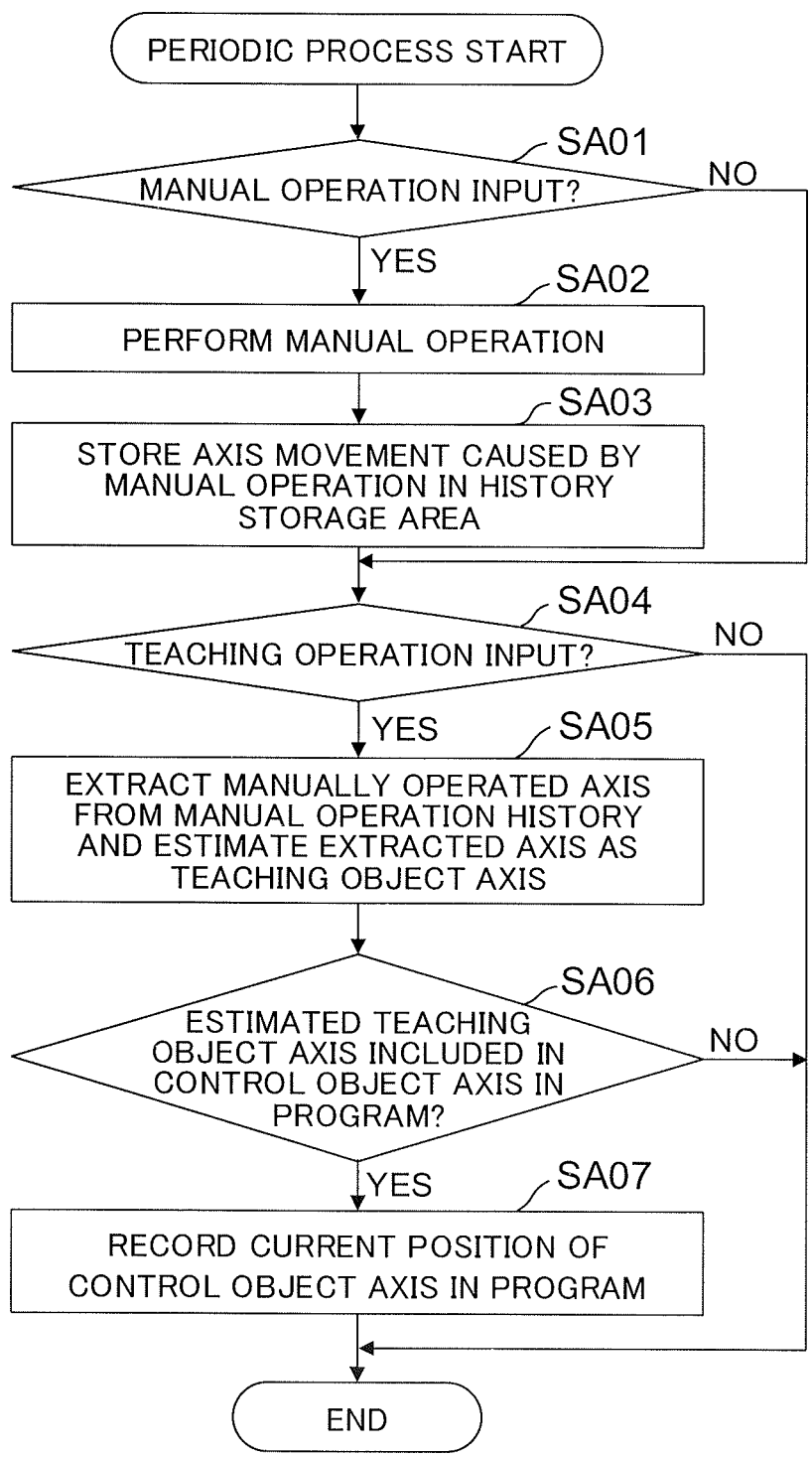
FIG. 4 is a flowchart showing a flow of processing performed on the numerical controller according to Embodiment 1 of the present invention.

FIG. 4 is a flowchart showing processing performed on the numerical controller 10 according to the present embodiment. This processing is performed in a periodic process after the program to be taught is selected by the operator (Operations 2 and 3).

[Step SA01] It is determined whether or not the operator's manual operation is input. If the manual operation is input, the processing proceeds to Step SA02. If not, the processing proceeds to Step SA04.

[Step SA02] Based on the operator's operation, the manual operation means 130 controls the manual operation to drive the axis of the manual operation mechanism section.

[Step SA03] The operation history recording means 140 obtains the information on the manual operation from the manual operation means 130, creates the history information on the axis movement caused by the manual operation, and records the created history information in the operation history storage area 210.

[Step SA04] It is determined whether or not the operator's teaching operation is input. If the teaching operation is input, the processing proceeds to Step SA05. If not, this processing in this period ends.

[Step SA05] A history of the manual operation is obtained from the operation history storage area 210, a manually operated axis is extracted, and the extracted axis is estimated as the teaching object axis.

[Step SA06] It is determined whether or not the control object axis in the program selected as an object to be taught includes the teaching object axis estimated in Step SA05. If the estimated teaching object axis is included, the processing proceeds to Step SA07. If not, this processing in this period ends.

[Step SA07] The current position of the control object axis in the program selected as an object to be taught is recorded in a part of this program designated by the operator.

Embodiment 2

In a numerical controller according to the present embodiment, a function of notifying an operator of occurrence of erroneous teaching is added to the functions of the numerical controller 10 of Embodiment 1 described above.

Let us assume that the operator selected the program MOVE-A, displayed it on the screen, and started editing in Operation 1, as described with reference to FIG. 3 in Embodiment 1, and then moved the Xb-axis of the mechanism section B by manual operation in Operation 2.

At this time, the movements of the Xa- and Ya-axes are not recorded on the axis movement history information stored in the operation history storage area 210, so that the Xa- and Ya-axes are not included in the estimated teaching object axis. This estimated teaching object axis is not included in the control object axes (Xa, Ya) in the program MOVE-A. Even if the operator performs the teaching operation in Operation 3, therefore, the erroneous teaching preventing means 170 prohibits reflection of the teaching operation on the program MOVE-A and notifies the operator of the ineffectiveness of the teaching operation by, for example, using an unusual color for the characters of the program.

The operator may be warned by any methods that enable him/her to ascertain the ineffectiveness of the teaching operation, such as blinking of the program characters, display of a warning message, warning sounding, and the like.

Figure 5:
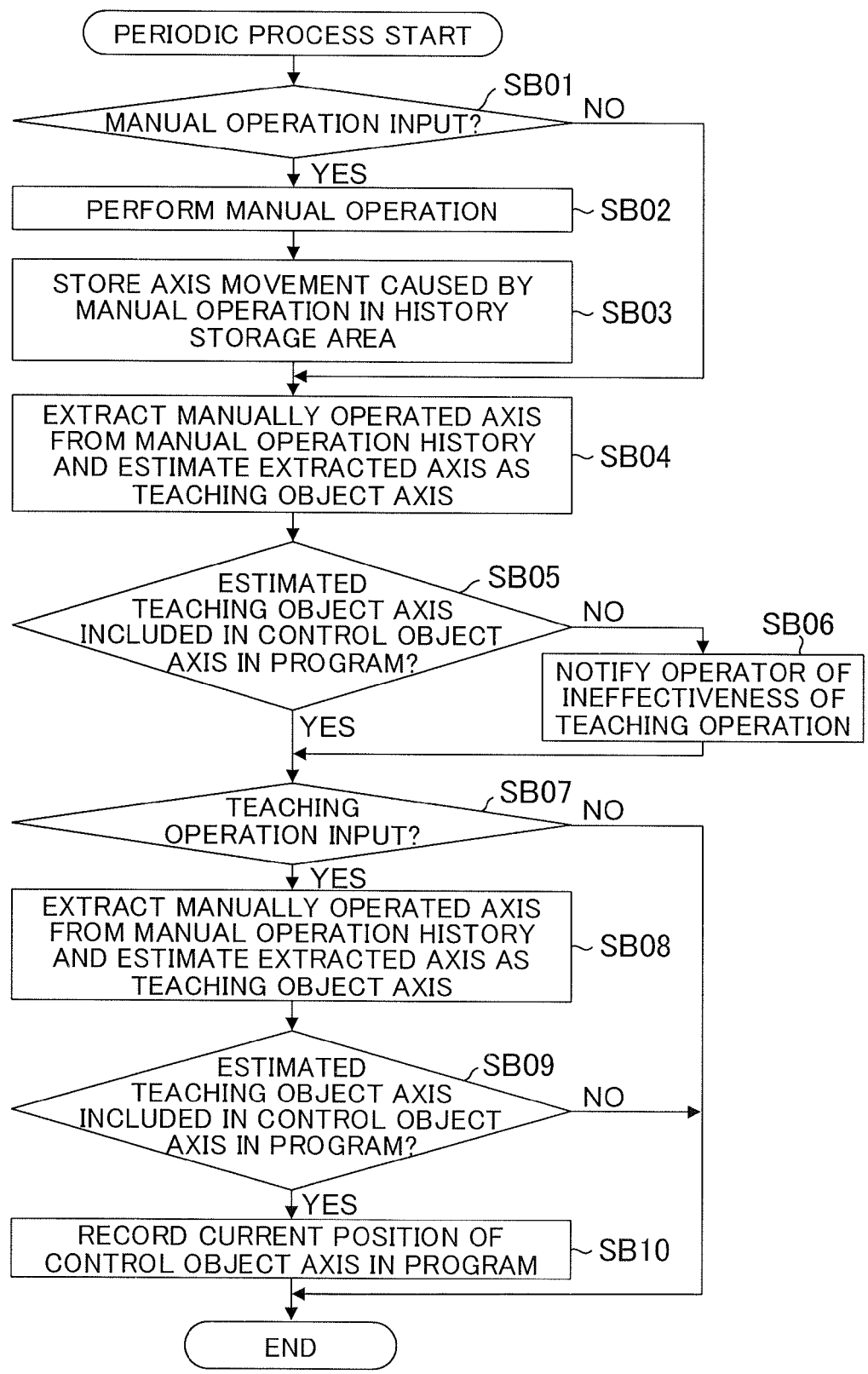
FIG. 5 is a flowchart showing a flow of processing performed on a numerical controller according to Embodiment 2 of the present invention.

FIG. 5 is a flowchart showing processing performed on the numerical controller 10 according to the present embodiment. This processing is performed in periodic processes (Operations 2 and 3 shown in FIG. 3) after the operator's selection of the program to be taught.

[Step SB01] It is determined whether or not the operator's manual operation is input. If the manual operation is input, the processing proceeds to Step SB02. If not, the processing proceeds to Step SB04.

[Step SB02] Based on the operator's operation, the manual operation means 130 controls the manual operation to drive the axis of the manual operation mechanism section.

[Step SB03] The operation history recording means 140 obtains the information on the manual operation from the manual operation means 130, creates the history information on the axis movement caused by the manual operation, and records the created history information in the operation history storage area 210.

[Step SB04] A history of the manual operation is obtained from the operation history storage area 210, a manually operated axis is extracted, and the extracted axis is estimated as a teaching object axis.

[Step SB05] It is determined whether or not the control object axis controlled by the program selected as an object to be taught includes the teaching object axis estimated in Step SB04. If the estimated teaching object axis is included, the processing proceeds to Step SB07. If not, the processing proceeds to Step SB06.

[Step SB06] The operator is notified of the ineffectiveness of his/her teaching operation.

[Step SB07] It is determined whether or not the operator's teaching operation is input. If the teaching operation is input, the processing proceeds to Step SB08. If not, this processing in this period ends.

[Step SB08] The history of the manual operation is obtained from the operation history storage area 210, the manually operated axis is extracted, and the extracted axis is estimated as a teaching object axis.

[Step SB09] It is determined whether or not the control object axis in the program selected as an object to be taught includes the teaching object axis estimated in Step SB08. If the estimated teaching object axis is included, the processing proceeds to Step SB10. If not, this processing in this period ends.

[Step SB10] The current position of the control object axis in the program selected as an object to be taught is recorded in a part of the program designated by the operator.

Embodiment 3

In the present embodiment, a function of forcibly enabling the teaching operation even when the operator's teaching is determined to be erroneous is added to the functions of the numerical controllers of Embodiments 1 and 2 described above. This additional function is effective in a case where the position of the mechanism section A is expected to be taught to the program by operating the mechanism section A by a method other than the operator's manual operation, in the numerical controller described with reference to FIG. 3, for example.

Let us assume that an operator performed the following operations in the numerical controller (Embodiment 1) having the configuration described with reference to FIG. 3A.

Operation 1: The operator selected the program MOVE-A, displayed it on the screen, and started editing.

Operation 2: The operator moved the Xb-axis of the mechanism section B by manual operation so as not to hinder the movement of each axis of the mechanism section A.

Operation 3: The operator moved the positions of the Xa- and Ya-axes without any manual operation (e.g., by causing another program to be operated).

Operation 4: The operator attempts to teach the current position of the mechanism section to the program MOVE-A.

Operation 5: The operator attempts to teach the current position of the mechanism section to the program MOVE-A.

Further, FIG. 6 is a table showing the relationships between the aforementioned operations by an operator and the individual function means (program selection means 110, manual operation means 130, and teaching operation means 150 shown in FIG. 1) of the numerical controller 10.

In FIG. 6, the operator performs manual operation by operating the control panel 70 and the like in Operation 2 and moves the Xb-axis of the mechanism section B, so that a movement history of the Xb-axis is recorded on the operation history storage area 210. Even if the operator performs the teaching operation in Operation 4, therefore, the estimated teaching object axis is the Xb-axis, the teaching operation to the program MOVE-A is disabled, and the operator is notified of the ineffectiveness of the teaching operation.

If the operator performs the teaching operation again in Operation 5, thereafter, the erroneous teaching preventing means 170 determines that the operator's teaching operation is not erroneous, the teaching operation to the program MOVE-A selected as an object to be taught is not disabled, and the teaching operation is performed so as to reflect the current position of the control object axis on a relevant part of the program MOVE-A.

Embodiment 4

In connection with Embodiment 1 described above, a case is shown, for ease of illustration, in which a single piece of history information on the axis movement to be estimated is stored in the operation history storage area 210. If the manual operation is performed with a plurality of mechanism sections switched between one another, however, the axis movement history information may sometimes include the history information on the axis movement that has been operated before such switching. In the present embodiment, therefore, only the last axis for which the manual operation is performed is estimated as the teaching object axis.

Let us assume that an operator performed the following operations in the system of Embodiment 1 with the configuration described with reference to FIG. 3A.

Operation 1: The operator moved the Xb-axis by manual operation.
Operation 2: The operator selected the program MOVE-B, displayed it on the screen, and started editing.
Operation 3: The operator moved the Xa-axis by manual operation in order to move the mechanism section A to a position to be taught to the program.
Operation 4: The operator attempts to teach the current position of the mechanism section to the program MOVE-B.

Further, FIG. 7 is a table showing the relationships between the aforementioned operations by an operator and the individual function means (program selection means 110, manual operation means 130, and teaching operation means 150 shown in FIG. 1).

If the operator then performs the teaching operation in Operation 4, the teaching object axis estimating means 160 estimates the teaching object axis based on the axis movement history information stored in the operation history storage area 210. The operation history storage area 210 is loaded with history information on the Xa-axis (axis of the mechanism section A) and the Xb-axis (axis of the mechanism section B).

Since the Xa-axis (axis of the mechanism section A) has been moved by manual operation just before the teaching operation, by the teaching object axis estimating means 160 of the present embodiment, the Xa-axis is estimated to be the teaching object axis.

Thus, the teaching operation to the program MOVE-B in which the Xa-axis is not included in the teaching object axes is disabled.

Embodiment 5

In connection with Embodiment 1, the case is shown, for ease of illustration, in which the single piece of history information on the axis movement to be estimated is stored in the operation history storage area 210. If the manual operation is performed with a plurality of mechanism sections switched between one another, however, the axis movement history information may sometimes include the history information on the axis movement that has been operated before such switching. In the present embodiment, therefore, the axis for which the manual operation is performed during a certain past period of time is estimated as the teaching object axis.

Let us assume that an operator performed the following operations by the numerical controller of Embodiment 1 with the configuration described with reference to FIG. 3A.

Operation 1: The operator selected the program MOVE-B, displayed it on the screen, and started editing.
Operation 2: The operator moved the Xb-axis by manual operation.
Operation 3: The operator attempts to teach the current position of the mechanism section to the program MOVE-B.

Further, FIG. 8 is a table showing the relationships between the aforementioned operations by an operator and the individual function means of the numerical controller 10.

If a predetermined time then passes between Operations 2 and 3, the teaching operation in Operation 3 is not always intended to teach the position of the Xb-axis which has been moved in Operation 2 performed earlier. Therefore, the teaching object axis estimating means 160 operates so that the Xb-axis is not estimated as a teaching object axis. Thus, the teaching operation to the program MOVE-B is disabled.

Embodiment 6

In connection with Embodiment 1 described above, the case is shown, for ease of illustration, in which the single piece of history information on the axis movement to be estimated is stored in the operation history storage area 210. If the manual operation is performed with a plurality of mechanism sections switched between one another, however, the axis movement history information may sometimes include the history information on the axis movement that has been operated before such switching. In the present embodiment, therefore, the axis for which the manual operation has once been performed after the latest teaching operation is estimated as the teaching object axis. In this way, moving and teaching the mechanism section that is not an object to be controlled after the preceding teaching operation, which is supposed to be erroneous, can be prevented.

Let us assume that an operator performed the following operations by the numerical controller of Embodiment 1 with the configuration described with reference to FIG. 3A.

Operation 1: The operator selected the program MOVE-B, displayed it on the screen, and started editing.
Operation 2: The operator moved the Xb-axis by manual operation.
Operation 3: The operator attempts to teach the current position of the mechanism section to the program MOVE-B.
Operation 4: The operator moved the Xa-axis by manual operation.
Operation 5: The operator attempts to teach the current position of the mechanism section to the program MOVE-B.

Further, FIG. 9 is a table showing the relationships between the aforementioned operations by an operator and the individual function means of the numerical controller 10.

Since the operator moves the Xb-axis by manual operation in Operation 2, the estimated teaching object axis is the Xb-axis in the teaching operation in Operation 3. Thus, the teaching operation to the program MOVE-B in which the Xb-axis is included in an object to be controlled is enabled.

Thereafter, only the Xa-axis moves in the manual operation after the teaching operation in Operation 3. Therefore, only the Xa-axis is estimated as the teaching object axis by the teaching object axis estimating means 160. Thus, in Operation 5, the teaching operation to the program MOVE-B in which the Xa-axis is not included in the object of control is disabled.

Embodiment 7

In the embodiments described herein, the axis subjected to the teaching operation is estimated from the operation history for manual operation. However, in some cases, there may be axes that have to be manually operated frequently in a situation unrelated to teaching operation in one and the same numerical controller. In the present embodiment, a function is provided that can previously register an axis which frequently requires manual operation even during the teaching operation as an axis not to be taught so that such an axis can be excluded from the teaching object axis estimation.

Figures 10A, 10B:
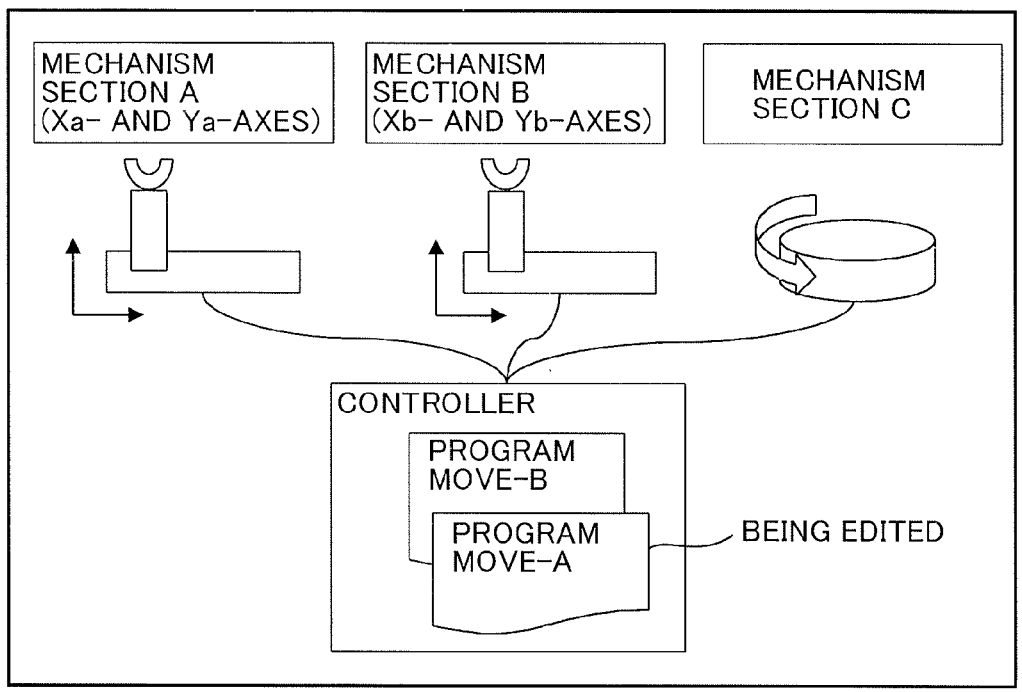
FIGS. 10A and 10B are diagrams illustrating a mechanism controlled by a numerical controller according to Embodiment 7 of the present invention.

FIGS. 10A and 10B show three mechanism sections, mechanism section A (Xa- and Ya-axes), mechanism section B (Xb- and Yb-axes) and mechanism section C, controlled by the numerical controller 10 according to the present embodiment. Of these mechanism sections, the mechanism section C is an axis that frequently requires manual operation regardless of teaching operation, even during program editing, so that it is registered in advance as an axis not to be taught.

Let us assume that an operator performed the following operations in the system having a configuration as described with reference to FIG. 10A.

Operation 1: The operator selected the program MOVE-A, displayed it on the screen, and started editing.

Operation 2: The operator moved the Xa-axis by manual operation in order to move the mechanism section A to a position to be taught to the program.

Operation 3: The operator moved the Xc-axis by manual operation.

Operation 4: The operator attempts to teach the current position of the mechanism section to the program MOVE-A.

Further, FIG. 10B is a table showing the relationships between the aforementioned operations by an operator and the individual function means of the numerical controller 10.

If the functions of the present embodiment are not provided in this case, e.g., if the axis for which the manual operation was performed last is estimated as a teaching object axis, as in Embodiment 4, the Xc-axis is estimated to be the teaching object axis, as a result, the teaching operation in Operation 4 is disabled.

However, by providing the functions of the present embodiment and registering in advance the axis of the mechanism section C as an axis not to be taught, the axis of the mechanism section C registered as an axis not to be taught is excluded from the determination of an axis in the processing of estimating a teaching object axis by the teaching object axis estimating means 160. Thus, operations of teaching to each program will not be disabled even if the axis of the mechanism section C is subjected to a manual operation.

While embodiments of the present invention have been described herein, it should be noted that the invention is not limited to those embodiments and can be suitably modified to be embodied in other forms.

For example, the estimation processing performed by the teaching object axis estimating means may be based on any method that enables an operator to estimate his/her intended teaching object axis, e.g., the axis for which the operation has been performed most frequently within the certain period of time just before the teaching operation. Further, a plurality of estimation methods may be used in suitable combinations within a consistent range.

The invention claimed is:

1. A numerical controller including a plurality of axis control programs for individually controlling axes of a plurality of mechanism sections, and configured to reflect the positions of the axes on the plurality of axis control programs by a teaching operation and control the mechanism sections based on the plurality of axis control programs, the numerical controller comprising:
a program selection unit configured to select, from among the plurality of axis control programs, an axis control program as an object to be taught;
a control object axis extraction unit configured to extract, from among the axes, a control object axis to be controlled by the axis control program selected by the program selection unit;
a manual operation unit configured to move the axis by a manual operation;
an operation history recording unit configured to record a history of movement of the axis by the manual operation;
a teaching operation unit configured to accept the teaching operation;
a teaching object axis estimating unit configured to estimate a teaching object axis based on the history of movement recorded by the operation history recording unit; and
an erroneous teaching preventing unit configured to prohibit the position of the axis from being reflected on the axis control programs by the teaching operation if the teaching object axis estimated by the teaching object axis estimating unit is not included in the control object axis extracted by the teaching object axis estimating unit.

2. The numerical controller according to claim 1, wherein the erroneous teaching preventing unit notifies that the reflection of the position of the axis on the axis control programs by the teaching operation is prohibited.

3. The numerical controller according to claim 1, wherein the erroneous teaching preventing unit permits the position of the axis from being reflected on the axis control programs by the teaching operation, by repeatedly performing the teaching operation, even in the case where the reflection of the axis position on the axis control programs by the teaching operation is not permitted.

4. The numerical controller according to claim 1, wherein the teaching object axis estimating unit estimates, as a teaching object axis, only the last axis for which the manual operation is performed, among other axes recorded on the movement history.

5. The numerical controller according to claim 1, wherein the teaching object axis estimating unit estimates, as a teaching object axis, the axis for which the manual operation has been performed within a certain period of time just before the teaching operation, among other axes recorded on the movement history.

6. The numerical controller according to claim 1, wherein the teaching object axis estimating unit estimates, as a teaching object axis, the axis for which the manual operation has been performed after the immediately preceding teaching operation, among other axes recorded on the movement history.

7. The numerical controller according to claim 1, wherein the teaching object axis estimating unit excludes a predetermined axis from the teaching object axis to be estimated.

* * * * *